United States Patent [19]
Hildebrand et al.

[11] Patent Number: 5,338,915
[45] Date of Patent: Aug. 16, 1994

[54] PROCESS FOR TEXTURING THE SURFACES OF WORKPIECES WITH A LASER BEAM

[75] Inventors: Peter Hildebrand, Pfronten; Gunter Eberl, Waltenhofen; Josef Neumaier, Pfronten-Steinach; Peter Wrba, Unterthingau, all of Fed. Rep. of Germany

[73] Assignee: MAHO Aktiengesellschaft, Pfronten, Fed. Rep. of Germany

[21] Appl. No.: 958,252

[22] Filed: Oct. 8, 1992

[30] Foreign Application Priority Data

Oct. 10, 1991 [DE] Fed. Rep. of Germany ....... 4133620

[51] Int. Cl.$^5$ ............................................. B23K 26/00
[52] U.S. Cl. .......................... 219/121.69; 219/121.61
[58] Field of Search ............... 219/121.69, 121.68, 219/121.61

[56] References Cited

U.S. PATENT DOCUMENTS 4,794,680  1/1989  Meyerhoff et al. ........ 219/121.69 X
4,758,705  7/1988  Hertzel et al. .............. 219/121
4,806,731  2/1989  Bragard et al. ............. 219/121.69

FOREIGN PATENT DOCUMENTS

4102984  4/1992  Fed. Rep. of Germany .

*Primary Examiner*—C. L. Albritton
*Attorney, Agent, or Firm*—Weingarten, Schurgin, Gagnebin & Hayes

[57] ABSTRACT

A process for texturing the surface of a workpiece with a laser beam, the beam being moved by a control unit along a tracking line predetermined by tracking points on the surface of the workpiece to be processed. Desired points that form the midpoints of surface areas are found on the trajectory established on the surface of the workpiece. A tracking point is determined in each of the surface areas. Furthermore, recessed areas and surface areas can be established arbitrarily on the surface of the workpiece, wherein the tracking points fall within the surface areas and not in the recessed areas. Moreover, an imaginary matrix can be formed upon the surface of the workpiece that includes tracking points determined in accordance with a degree of coverage and a random value.

23 Claims, 8 Drawing Sheets

PROCESS FOR TEXTURING THE SURFACES OF WORKPIECES WITH A LASER BEAM

FIELD OF THE INVENTION

This invention relates to processes for texturing a surface of a workpiece with a laser beam, and particularly to a process wherein a laser beam traverses the surface of a workpiece along a tracking line.

BACKGROUND OF THE INVENTION

The surfaces of many functional objects, such as those made of plastic, must have a certain texture for visual or other reasons, so as to provide a uniform degree of roughness, a structure that corresponds to different types of leather, or even a fine porous nature, for example. To obtain these various surface textures, the respective molds, rollers or other shaping elements must undergo an expensive process that involves either cutting, etching, sand-blasting, or the like.

A generic process for structuring a nip roller for cameras is known from U.S. Pat. No. 4,758,705, wherein texturing is performed while the roller is clamped in a turning gear using a pulsed laser beam that traverses the surface of the rollers. The laser beam and the roller are controlled by a control unit such that a predetermined pattern is engraved on the roller. However, the pattern so produced has a uniform texture, and such a textured surface cannot be used as an imitation of a natural material, for example.

German Patent DE 41 02 984 A1 describes a process for producing a surface texture on a roller, wherein the diameter and the depth of recesses on the roller is controlled by a control unit with an electron beam. Also, a random generator is used to determine the texture of a recess in a spatial dimension. According to this publication, textures like steel grit can be simulated, but a lot of computer time is needed to generate such textures. Moreover, the textures so produced are not suitable for imitating random uneven structures, such as leather.

It would be desirable to create a process for texturing the surfaces of workpieces with a laser beam that makes it possible to produce different types of surface structures using different materials in a way that is fast and technically simple.

SUMMARY OF THE INVENTION

A process is provided for texturing the surface of a workpiece with a laser beam wherein trajectories are established on the surface to be processed, and the trajectories are divided into discrete sections by desired points. Around each desired point, an elliptical or circular surface area is established, and in each of these surface areas, a tracking point is selected arbitrarily, for example, by means of a random generator. By connecting the tracking points selected in this way, a tracking line is obtained that is followed by the laser, so that a corresponding line is traced on the surface of the workpiece. By choosing the size of the pieces and/or the size of the elliptical or circular surface areas, and by repeating these operations many times, possibly in different directions, a large number of lines, that may crisscross, is produced on the surface of the workpiece, so that a surface texture is created with an approximately even degree of roughness. By using a pulsed laser in this way, surface texturing can be obtained that previously could only be obtained by sand-blasting.

According to the invention, surface textures can be obtained on workpieces made of metal, ceramics, glass, plastic, or the like, for example, that have a leather-like quality. To do so, recessed areas are established arbitrarily on the surface of the workpiece, which are not to be processed. At the starting point of a track to be processed, the length and direction of a desired line are established. At the end point of each desired line, an elliptical or circular surface area is established, in which a tracking point is arbitrarily selected. This tracking point may not, however, lie in one of the recesses, i.e., the areas not to be processed. If a valid tracking point is found, then it is followed by the laser and/or stored in an appropriate control unit. The tracking point determined in this way then forms the starting point for the next desired line, whose length and direction can then in turn be established arbitrarily. These operations are repeated until the edge of the surface of the workpiece to be processed is reached. Then other processing cycles follow on adjacent tracks, until the whole surface of the workpiece to be processed has a large number of irregular lines that may crisscross and do not run over the pre-established recessed area.

According to one embodiment of the invention, the processing specified above can be repeated in another preferred direction, and for this, only the workpiece is rotated at a corresponding angle.

The dimensions of the recessed areas, such as the elliptical or circular surface areas, can be set arbitrarily, e.g., they can be set equal to one another.

Furthermore, the desired direction of any one desired line can be changed dynamically within a tracking line. To accomplish this, an angle offset can be used, which is asymptotically varied up to a predetermined angle-offset limit. The angle-offset limit can be re-established before a new tracking line is worked out. In this way, surface textures such as leather can be created.

Tracks of various depths can be engraved onto the surface of the workpiece to be processed by a tracking line that is intermittent and may move many ways, wherein the lengths of the lines and pause areas can be set within predetermined limits with a random generator.

According to another embodiment of the invention, if the tracking points are established arbitrarily and do not lie within the recessed areas, a predetermined maximum number of attempts to pass over this recessed area can be set. After this maximum number is exceeded, the process can be discontinued. After that, processing can start on another tracking line. By introducing a maximum number, computing time can be reduced, and other textures, such as animal hides, can be achieved.

According to another embodiment of the invention, when an area to be textured remains on the surface of the workpiece, the desired direction of the tracking line can be preserved when starting the next area to be textured. In this way, when the tracking lines cross on the edges of the already textured area, seams between textured areas can be made invisible, and a seamless transition of the tracking lines can be achieved. This can be achieved by producing a generated right/left or top/bottom symmetry, wherein the desired direction is retained when the laser leaves a textured area. The new starting coordinates and the new direction of the tracking lines running into one another in the next textured area to be processed can include the end coordinates and the previous direction of the previous textured area.

A particularly advantageous field of application for the process of the invention is mold-making, wherein it can be used to provide articles, especially plastic ones, with a particular desired surface texture. Moreover, the process in the invention can also be used to process the surfaces of rollers and press plates that can be used to texture continuously molded articles, such as plastic strips.

According to the invention, the surface area to be textured can also be covered with an imaginary matrix, and each element in the matrix can be set according to random values, which can be varied. These random values specify the probability of a correlation and set up the elements in the matrix. When an element is set, the laser then processes that spot. The elements in the matrix that have been set according to the respective random value can be followed by the laser beam so as to texture the surface of the workpiece, and the lines of the set elements can be traced conveniently. First, a set element in the matrix is sought; a set element in the matrix corresponding to a point on the tracking line. Next, an adjacent point is sought, etc. Different search strategies can be used when searching for adjacent set elements. For example, the search for neighboring elements can be clockwise and counterclockwise, or random. If an adjacent element is found, then the laser is turned on and positioned on the adjacent element, and the search for the next adjacent element is continued. Elements in the matrix that have already been covered are marked. If no adjacent element is found, a new element is sought, and the line work above is continued until all the elements have been processed.

This type of texturing creates uniform surface textures covering the surface in an especially advantageous way that can be used especially for prostheses having textures that permit and promote the growth tissues into them. Here, appropriate textures must be used in a specific area into which the surrounding tissue can grow, and extremely large unprocessed parts of the surface are a disadvantage. The randomly modulated textures produced by the invention not only promote the process of tissue penetration, but also reduce the effect of stress that occurs in the engraved groove when the textures are uniform. This can improve the tensile, flexure, and torsional strength of an implanted prosthesis.

According to the invention, the established elements of the matrix, i.e., the tracking points, are established with a random generator. The random generator finds a random number, which can be compared to the probability value of a correlation with an element in the matrix, i.e., a degree of coverage. The element in the matrix is established as a tracking point if the random number of the random generator is smaller than the degree of coverage. In this way, a randomly modulated texture can be produced advantageously that does not have too many large free areas.

According to another embodiment of the invention, the coordinates of the elements of the matrix are moved within a predetermined range as a function of an off-lattice factor. By moving the coordinates of the elements in the matrix, the discrete desired directions of the tracking line can be softened continuously, thereby more evenly distributing the desired directions over the matrix. With a relatively large off-lattice factor, the tracking lines can intersect, which otherwise does not happen. This intersection allows various depths to be achieved in the texture of the surface, which can be an advantage in texturing the surface of prostheses, for example, since this can promote the process of tissue growing into the prosthesis.

BRIEF DESCRIPTION OF THE DRAWING

The invention will be more fully understood from the following solely exemplary description of a preferred embodiment taken in conjunction with the accompanying figures in which.

DETAILED DESCRIPTION OF A PREFERRED EMBODIMENT

Figure 1A:
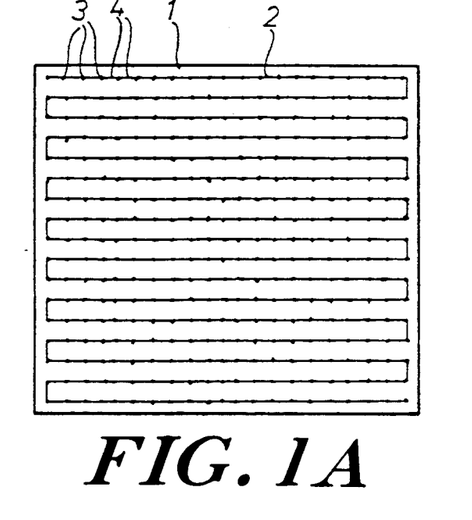
FIGS. 1A through 1F show various phases of processing for producing a surface texture that includes trajectories.
Figure 1B:
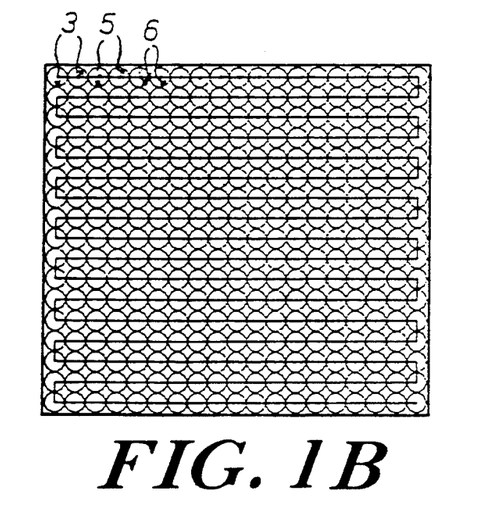
Figure 1C:
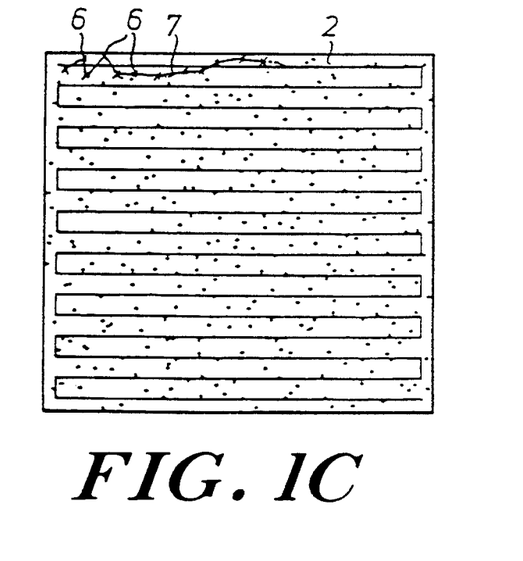
Figure 1D:
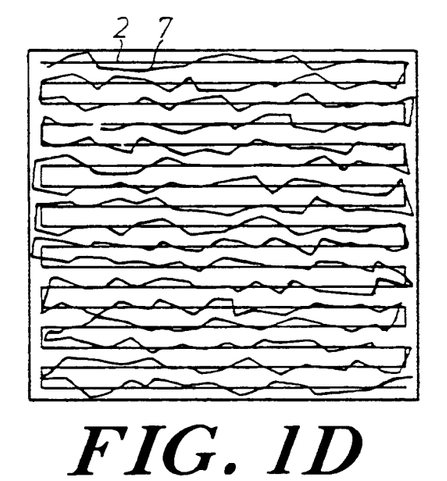
Figure 1E:
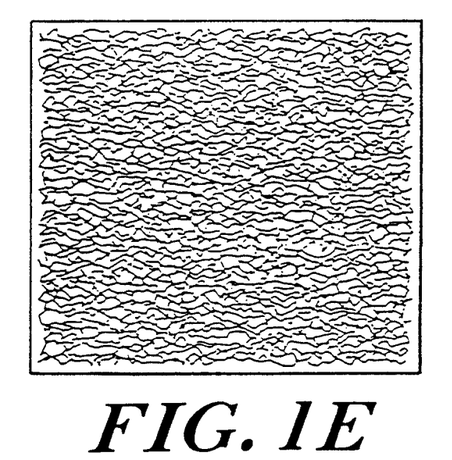
Figure 1F:
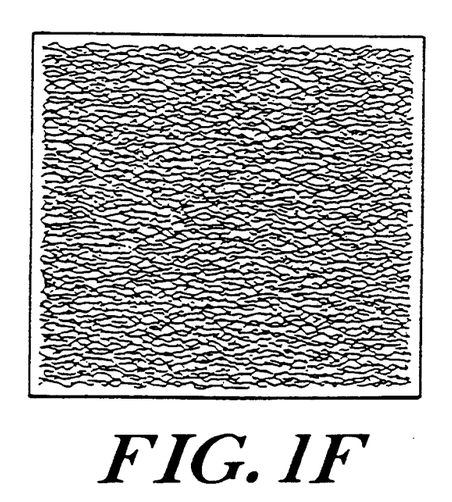

With reference to FIGS. 1A through 1F, to obtain the surface texture shown in FIG. 1F, a meandering trajectory 2 shown in FIG. 1A is established for use on the surface of the workpiece to be processed 1; this can be done either on the surface 1 itself or electronically in the memory of a control unit as displayed on a screen connected to a computer, or the like. Next, desired points 3 are established on this meandering trajectory 2, which are equidistant for this purpose, and the whole trajectory 2 is divided into discrete line sections 4. As shown in FIG. 1B, in a subsequent step, circular areas 5 are established around these desired points 3, the points 3 serving as respective center points of the surface areas 5, whose diameter can correspond to the length of the line section 4. Instead of these circular surface areas 5, other geometric areas, such as ellipses, can be used. Next, a random generator is used to establish one tracking point 6 in each of these surface areas 5. The line connecting these tracking points 6 then forms the tracking line 7 actually traced by the laser, as shown in FIG. 1D. When the process described above is repeated many times, a linear surface pattern is created, which pattern is shown in FIGS. 1E and 1F. This pattern is characterized by the fact that it runs in a preferred direction (here horizontal) on an otherwise arbitrary jagged tracking line 7. Other effects can also be achieved by rotating the workpiece 1 by an angle of 90° and repeating the processes described above. In this case, there are many crossing points on the jagged tracking line.

Figure 2A:
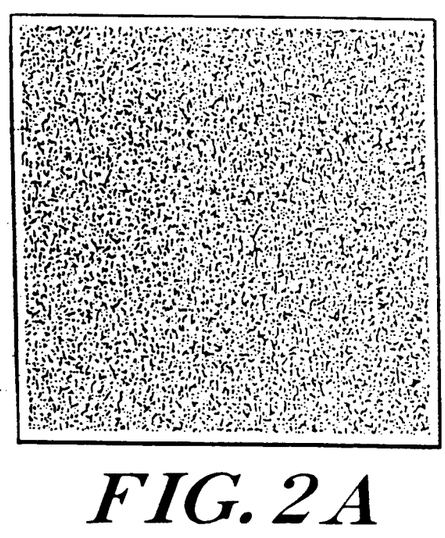
FIGS. 2A, 2B, and 2C show various surface textures produced according to the method invention.
Figure 2B:
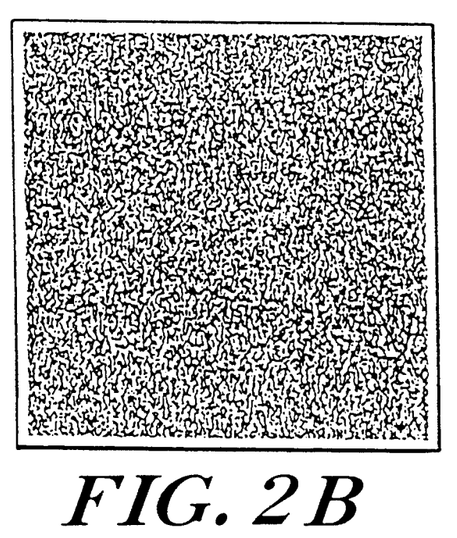
Figure 2C:
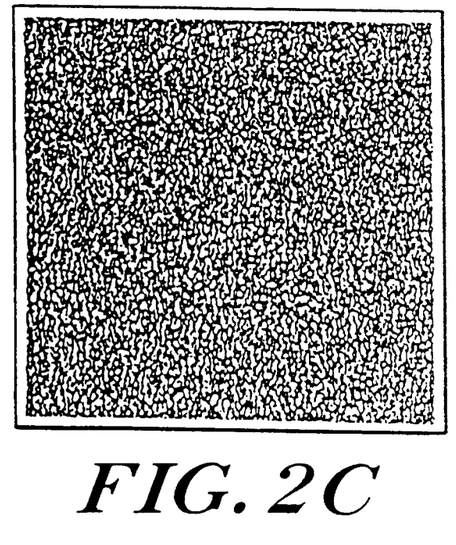

According to the process described above, if a pulsed laser is used instead of a continuous laser, surface textures like those shown in FIGS. 2A, 2B, and 2C can be created.

Figure 3:
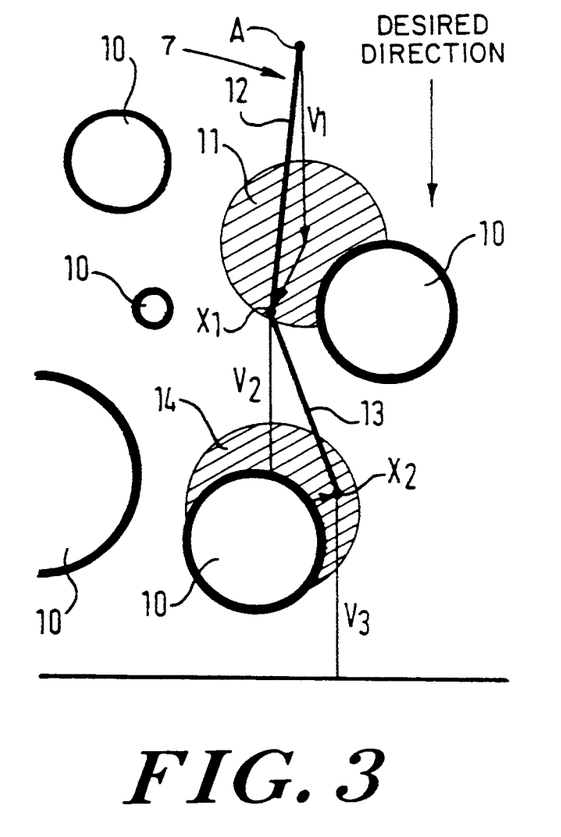
FIG. 3 shows a schematic process for obtaining a surface texture with recessed areas.

According to the invention, special textures can also be produced on the surface of a workpiece that are similar to the surface structures of natural products, such as leather, stone, cork, or the like, as well as textiles. The process for obtaining such textures is as follows. Referring to FIG. 3, a number of tracking lines 7 and their starting points A are established on the surface of the workpiece 1 to be processed and, if necessary, are stored electronically. In the next step, recessed areas 10 are established on the total surface of the workpiece 1 to be processed in an arbitrary pattern and, as shown in FIG. 3, they can be different in form and size from one another. These recessed areas should remain unprocessed so as to achieve a special visual impression on the finished processed surface. One appropriate way of establishing the recessed areas 10 is to find arbitrary tracking points 6, as shown in FIGS. 1A, 1B, and 1C, that represent the midpoints of the recessed areas 10, in this case. Around these points 6, the recessed areas 10 are defined in the form of circles with arbitrarily chosen radii as shown in FIG. 3.

Figure 4A:
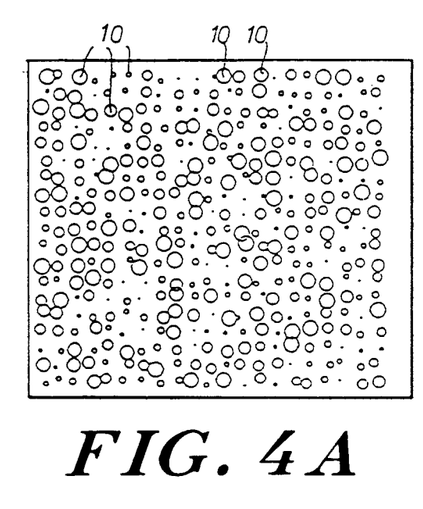
FIGS. 4A through 4F show various phases in the processing in accordance with the process of FIG. 3.
Figure 4B:
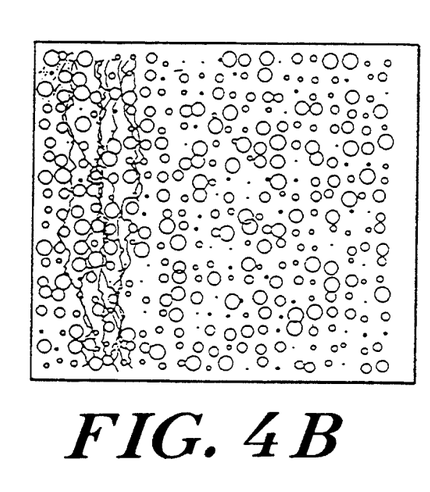
Figure 4C:
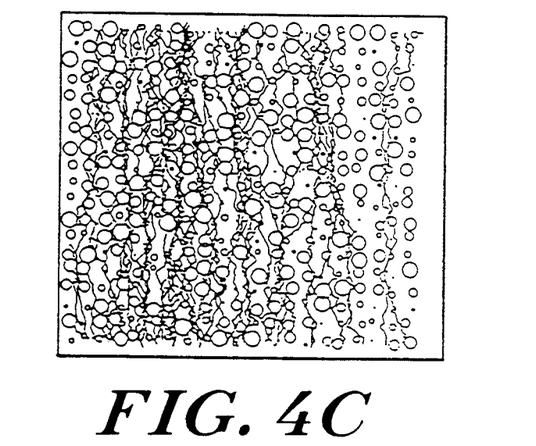
Figure 4D:
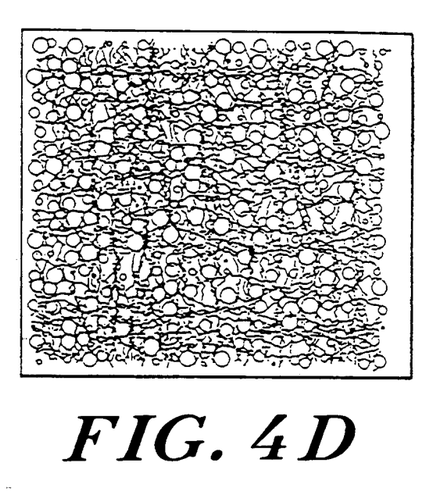
Figure 4E:
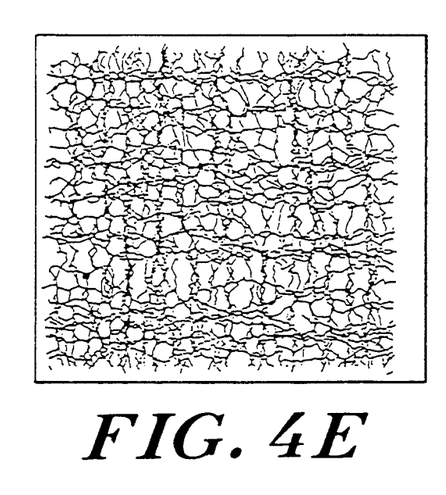
Figure 4F:
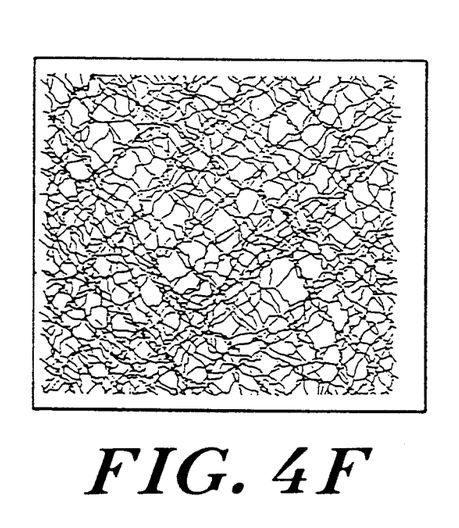

In another step of the process, the number of tracking lines required to produce the surface texture, the amplitude of the maximum tracking deviation, and the starting point A of each tracking line are established. Next, the general desired direction for the track is established. From starting point A of each tracking line, a vector V of a given length is determined in the tracking direction. Around the end point of this vector V, a geometrically determined surface element, in this case a circular surface area 11 is determined, whose radius corresponds to the amplitude of the maximum deviation from the track. A random generator is then used to determine a tracking point $X_1$ on the periphery of the circular surface area 11. If this point $X_1$ is in one of the recessed areas 10, the random generator repeatedly determines a point until a tracking point $X_1$ is found within one of the circular hatched areas, such as areas 11 and 14 in FIG. 3. This tracking point $X_1$ forms the end point of a tracking section 12 of the tracking line 7, and at the same time, the starting point for another tracking section 13. To obtain this tracking section 13, a vector $V_2$ is established in the desired direction, around whose end point another circular surface area 14 is drawn. In this surface area 14, the random generator again finds a tracking point $X_2$ which lies outside of the recessed area 10 in the surface area 14 This tracking point $X_2$ forms the end point of the tracking line 13 and the starting point for another vector $V_3$. These operations are repeated until the opposite edge of the surface of the workpiece 1 to be processed is reached. Going back and forth over points A, $X_1$, $X_2$, to $X_n$ with the laser beam creates a zig-zag-shaped tracking line that does not cut into or touch any of the recessed areas 10. Such an operation is shown in FIG. 4B, where the distribution and layout of the recessed areas 10 on the surface 1 of the workpiece can be inferred from FIG. 4A. FIGS. 4C, 4D, and 4E show other phases of the surface texturing; in FIGS. 4C and 4D, the recessed areas 10 are shown as circles. Another peculiarity of the texturing can be achieved by rotating the workpiece 90° in a preferred direction after processing the surface and beginning again in another preferred direction. Corresponding patterns and textures are shown in FIGS. 4E and 4F.

Variations can be achieved in various ways with the procedures described above. For example, if the dimensions chosen for the surface areas that provide the maximum deviation amplitude are larger than the distances between the desired points 3 in FIG. 1, then the zig-zag tracking lines crisscross, and the material at the intersections is cut to a greater depth. Also, the width of the respective tracking line processed by the laser can be kept constant by keeping the laser power and the distance between the laser lens and the surface of the workpiece constant. However, to achieve special effects, it is also possible to change the laser power or the distance between the laser lens and the surface of the workpiece continuously or discontinuously during processing, which results in changes in tracking width and depth.

Uniform textures covering a surface are needed to provide prostheses where tissues grow into the structure, as well as to provide imitations of natural surfaces. Regarding the prostheses, specific depths or degrees of roughness must be produced to provide a surface that surrounding tissue can penetrate. In this application, the surface texture of the prosthesis must not have large surface sections that are unprocessed, since such sections would hinders the process of tissue bonding.

Figure 5:
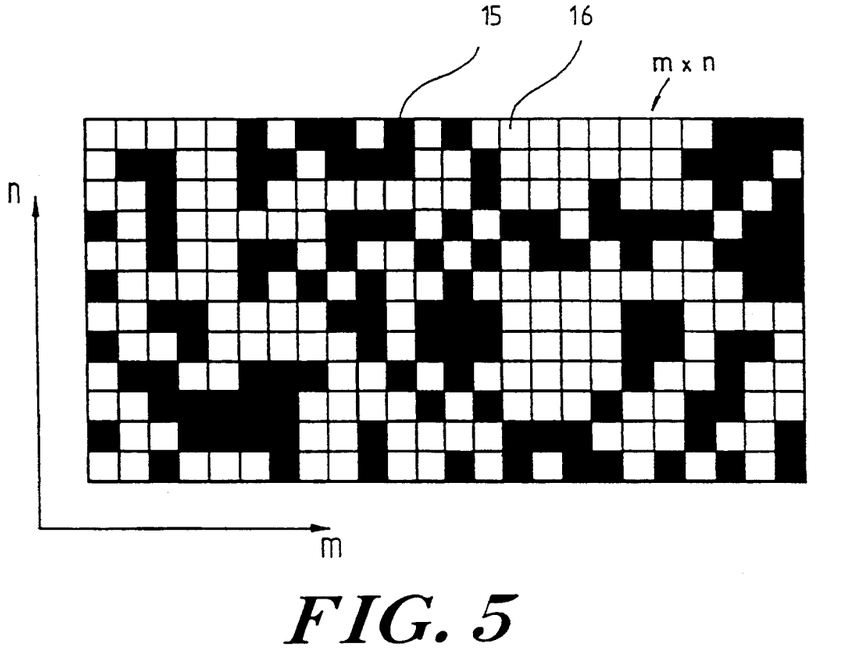
FIG. 5 is a matrix (m×n) formed on the surface of a workpiece.
Figure 6A:
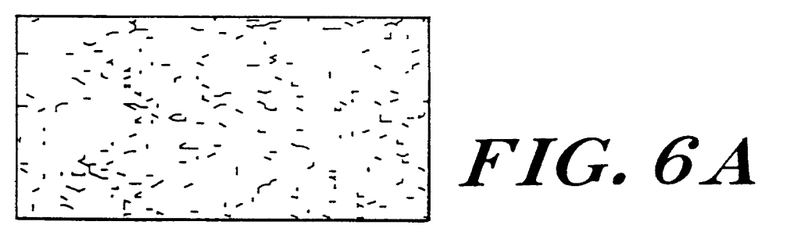
FIGS. 6A through 6F show surface textures with the degree of coverage increasing from FIG. 6A through 6F.
Figure 6B:
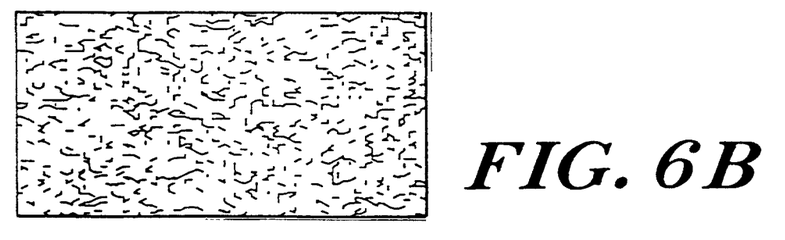
Figure 6C:
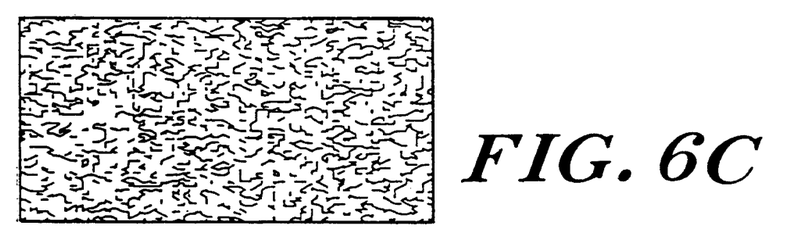
Figure 6D:
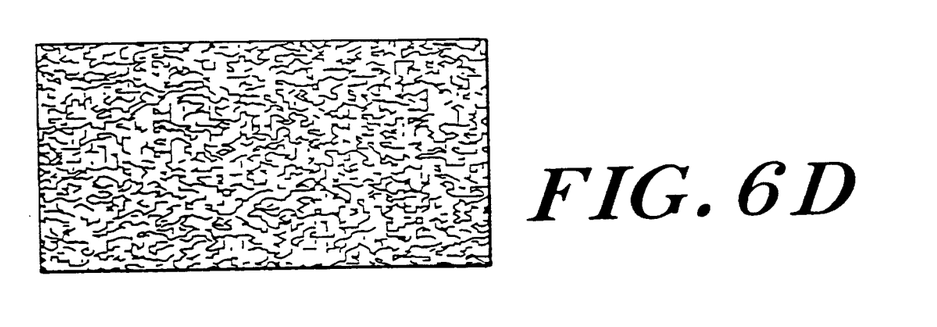
Figure 6E:
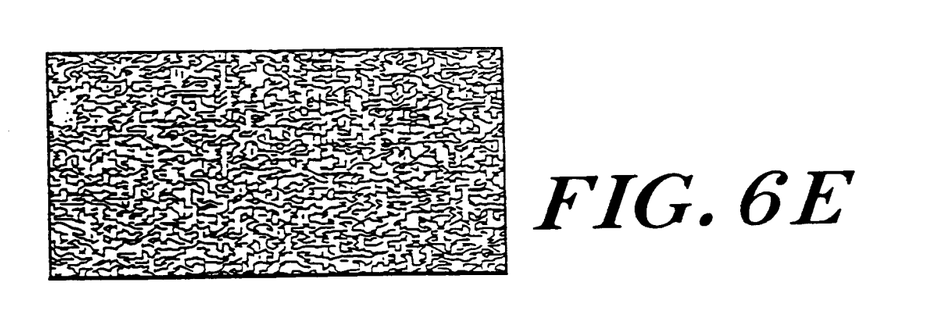
Figure 6F:
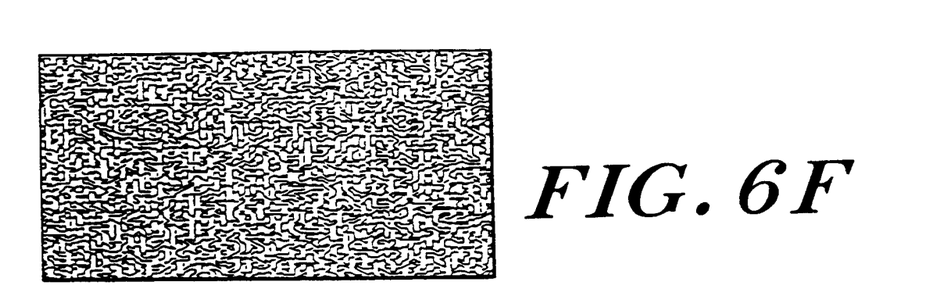

Referring to FIG. 5, to form the type of structure into which tissue can grow, a matrix $(m \times n)$ is superimposed on the surface of the workpiece 1, as shown in FIG. 5. Here the set elements 15 of the matrix $(m \times n)$ are shown filled in, while the elements 16 of the matrix $(m \times n)$ that are not set are shown as blank spaces. The ratio of the number of set elements 15 to the total number of elements in the matrix $(m \times n)$ corresponds to a predetermined degree of coverage of the matrix $(m \times n)$, wherein a 60% degree of coverage means that 60% of the elements in the matrix $(m \times n)$ are set elements 15, and 40% of the elements in the matrix $(m \times n)$ are not set elements 16. To find the set elements 15, a value between 0 and 1 is determined randomly for each element in the matrix $(m \times n)$ with a random generator. For example, when the degree of coverage is 60%, it is compared to the value 0.6. If the random number is smaller than or equal to 0.6, then this element is a set element 15; otherwise, it is not. To process the set elements 15, one starts, for example, in the upper left field (1,1) of the matrix $(m \times n)$ to find a set element 15. As shown in FIG. 5, the element (1,1) of the matrix $(m \times n)$ is not a set element 15. Therefore, the search can be continued line by line, until a set element 15 is found that corresponds to a tracking point. Adjacent tracking points 15 are now sought, for example clockwise or counterclockwise, around the set element 15. But other search strategies for adjacent set elements 15 can also be used, for example, first a horizontal, then a vertical, and then a diagonal search, or vice versa. Moreover, a random sequence is conceivable for the search for adjacent set elements 15. Set elements 15 are only gone over once by the laser, so that the texture is worked to a uniform depth. As soon as no adjacent set element 15 is found, the processing operation is discontinued and a new, nonadjacent set element 15 is sought. This search process can start again with element (1,1) in the matrix $(m \times n)$, or any other starting point on the matrix $(n \times m)$ can be used for the search. Various search strategies for new set elements 15 can also be used.

FIGS. 6A through 6F show textures that are suitable for tissue penetration. Here, the degree of coverage of the matrix $(m \times n)$ was varied in such a way that it increases as one moves from FIG. 6a to FIG. 6F.

By optimizing the path of the laser, the processing time necessary for the surface of a workpiece to be textured can be further minimized. Before the processing starts, continuous tracking lines can be sought on the workpiece and connected so as to result in minimal running time when processing.

Naturally, the process for producing a structure for tissue penetration can be used for all other surface textures that require randomly modulated textures without large unprocessed free areas, for example, for optimally fastening a foreign material on the workpiece.

As described above, according to the process of the invention, not only plane surfaces, but also three-dimensional curved surfaces can be textured. A basic asset here is the high processing power of the laser. Relatively large surface areas can be textured with any patterns desired in relatively short processing times that were previously unattainable.

Other modifications and implementations will occur to those skilled in the art without departing from the spirit and the scope of the invention as claimed. Accordingly, the above description is not intended to limit the invention except as indicated in the following claims.

What is claimed is:

1. A process for texturing a surface of a workpiece with a laser beam controlled by a control unit, comprising the steps of:
   determining a trajectory (2);
   determining a plurality of desired points (3) on the trajectory that divides the trajectory (2) into a plurality of segments (4);
   determining a surface area associated with each desired point (3); and
   selecting a tracking point (6) within each surface area (5) by arbitrary selection;
   determining a tracking line (7) using tracking points (6) on the surface of the workpiece (1) to be processed; and
   tracing the laser beam along the tracking line (7) under control of the control unit.

2. The process of claim 1 wherein the surface area is elliptical.

3. The process of claim 1 wherein the surface area is circular.

4. The process of claim 1 further including the step of:
   dividing the surface of the workpiece (1) into a plurality of processing subsurfaces;
   using a first desired direction of the tracking line (7) for processing a first processing subsurface; and
   using a second desired direction for processing a subsequent processing subsurface.

5. The process of claim 1 wherein the laser beam is of a power that is varied during the process.

6. The process of claim 1 wherein a lens of the laser beam is located at a distance from the surface of the workpiece that is varied during the process.

7. The process of claim 1 wherein the tracking lines (7) are followed several times, and wherein lengths and pause areas are arbitrarily set within a predetermined limit.

8. The process of claim 1 wherein tracking lines (7) extend in a plurality of directions, and wherein their lengths and pause areas are set arbitrarily within predetermined limits.

9. A process for texturing a surface of a workpiece (1) with a laser beam moved by a control unit along a tracking line (7) determined by tracking points ($X_1$, $X_n$) on the surface of the workpiece (1), the process comprising the steps of:
   (a) determining positions and dimensions of a plurality of recessed areas (10) on the surface of the workpiece (1) for preventing processing within each recessed area;
   (b) determining a starting point (A) on the tracking line (7);
   (c) determining a length and direction of a desired line ($V_1$, $V_n$) that originates from the starting point (A);
   (d) determining a surface area (11, 14) at the end point of the desired line ($V_1$, $V_n$);
   (e) determining a tracking point ($X_1$, $X_n$) on the surface area (11, 14) that does not lie within a recessed area (10) by arbitrary selection; and
   (f) repeating steps (c) through (f), wherein the starting point (A) is reset to the tracking point ($X_1$, $X_n$).

10. The process of claim 9 wherein the surface area is elliptical.

11. The process of claim 9 wherein the surface area is circular.

12. The process of claim 9 wherein the step of determining positions and dimensions of a plurality of recessed areas (10) on the surface of the workpiece (1) includes the steps of:
   determining a plurality of substantially mutually parallel lines; and
   providing coordinates of a plurality of points on each line of the plurality of substantially mutually parallel lines, each point serving as a center of a recessed area of said plurality of recessed areas.

13. The process of claim 9, wherein the dimensions of the plurality of recessed areas (10) are determined arbitrarily.

14. The process of claim 9 wherein the step of determining a tracking point ($X_1$, $X_n$) that does not lie within a recessed area by arbitrary selection further includes the step of:
   upon exceeding a predetermined maximum number of attempts to determine a tracking point that does not lie within a recessed area, attempting to determine a tracking point that does not lie within a recessed area that is included in a next tracking line.

15. The process of claim 9 further including the step of:
   dividing the surface of the workpiece (1) into a plurality of processing subsurfaces;
   using a desired direction of the tracking line (7) for processing a first processing subsurface; and
   using the desired direction for processing a subsequent processing subsurface.

16. The process of claim 9 further including the step of:
   dividing the surface of the workpiece (1) into a plurality of processing subsurfaces;
   using a first desired direction of the tracking line (7) for processing a first processing subsurface; and
   using a second desired direction for processing a subsequent processing subsurface.

17. The process of claim 9 wherein the laser beam is of a power that is varied during the process.

18. The process of claim 9 wherein a lens of the laser beam is located at a distance from the surface of the workpiece that is varied during the process.

19. The process of claim 9 wherein the tracking lines (7) are followed several times, and wherein lengths and pause areas are arbitrarily set within a predetermined limit.

20. The process of claim 9 wherein tracking lines (7) extend in a plurality of directions, and wherein their lengths and pause areas are set arbitrarily within predetermined limits.

21. A process for texturing the surface of a workpiece (1) with a laser beam that is moved by a control unit along a tracking line (7) determined by tracking points (15) on the surface of the workpiece (1), the process including the steps of:

(a) establishing an imaginary matrix (m×n) formed over the surface of the workpiece (1), the matrix including set elements and non-set elements;

(b) establishing a degree of coverage of the matrix (m×n), (c) establishing a number of set elements in the matrix (m×n) as tracking points (15), the number corresponding to the degree of coverage and a random value;

(d) searching for a tracking point (15), (e) detecting a next tracking point adjacent to the tracking point (15);

(f) repeating step (e) until a next tracking point cannot be found; and (g) repeating steps (d) through (f) until all tracking points (15) in the matrix (m×n) have been followed by the laser.

22. The process of claim 21, wherein the tracking points (15) are established by a random generator, wherein the random generator finds a random number, which number is compared with the degree of coverage, and a respective element of the matrix (m×n) is set as the tracking point (15) if the random number is smaller than the degree of coverage.

23. The process of claim 21 wherein coordinates of the elements in the matrix (m×n) are moved within a predetermined area as a function of an off-lattice factor.

* * * * *